(12) United States Patent
Sitsky et al.

(10) Patent No.: US 11,886,406 B2
(45) Date of Patent: Jan. 30, 2024

(54) SYSTEMS AND METHODS FOR SCALABLE DELOCALIZED INFORMATION GOVERNANCE

(71) Applicant: Nuix Limited, Sydney (AU)

(72) Inventors: David Sitsky, Garran (AU); Matthew Westwood Hill, Sydney (AU); Robin Power, Sydney (AU); Eddie Sheehy, Willoughby (AU); Stephen Stewart, Sydney (AU)

(73) Assignee: Nuix Limited, Sydney (AU)

( * ) Notice: Subject to any disclaimer, the term of this patent is extended or adjusted under 35 U.S.C. 154(b) by 0 days.

(21) Appl. No.: 17/332,526

(22) Filed: May 27, 2021

(65) Prior Publication Data

US 2021/0286788 A1    Sep. 16, 2021

Related U.S. Application Data

(63) Continuation of application No. 15/935,231, filed on Mar. 26, 2018, now Pat. No. 11,030,170, which is a
(Continued)

(51) Int. Cl.
*G06F 16/22*    (2019.01)
*G06F 16/31*    (2019.01)
*G06F 9/50*    (2006.01)

(52) U.S. Cl.
CPC ............. *G06F 16/22* (2019.01); *G06F 9/505* (2013.01); *G06F 16/31* (2019.01); *G06F 2209/5017* (2013.01)

(58) Field of Classification Search
CPC .................. G06F 9/505; G06F 17/30575
(Continued)

(56) References Cited

U.S. PATENT DOCUMENTS 5,230,047 A    7/1993 Frey, Jr. et al.
5,590,284 A    12/1996 Crosetto
(Continued)

FOREIGN PATENT DOCUMENTS

KR    20030013619 A    2/2003
KR    20050057834 A    6/2005
(Continued)

OTHER PUBLICATIONS

File, format, transform data with GCcloud, Google command line interface, Jun. 14, 2016.*
(Continued)

*Primary Examiner* — Hung T Vy
(74) *Attorney, Agent, or Firm* — Nutter McClennen & Fish LLP

(57) ABSTRACT

The invention relates to electronic indexing, and more particularly, to the indexing, in a cloud, data held in a cloud. Systems and methods of the invention index data by accessing the data in place in the cloud and breaking a job into work items and sending the work items to multiple cloud processes that can each determine whether to index data associated with the work item or to create a new work item and have a different cloud process index the data. Each cloud process is proximal to an item that it indexes. This gives the system scale as well as an internal load-balancing.

20 Claims, 6 Drawing Sheets

Related U.S. Application Data continuation of application No. 14/083,742, filed on Nov. 19, 2013, now Pat. No. 9,928,260, which is a continuation-in-part of application No. 13/961,030, filed on Aug. 7, 2013, now Pat. No. 9,785,700, which is a continuation-in-part of application No. 13/705,522, filed on Dec. 5, 2012, now Pat. No. 9,665,573, which is a continuation of application No. 12/866,950, filed as application No. PCT/US2009/033759 on Feb. 11, 2009, now Pat. No. 8,359,365.

(60) Provisional application No. 61/027,600, filed on Feb. 11, 2008, provisional application No. 61/027,603, filed on Feb. 11, 2008.

(58) Field of Classification Search
USPC .................................................. 707/741
See application file for complete search history.

(56) References Cited

U.S. PATENT DOCUMENTS

| | | | |
|---|---|---|---|
| 5,838,913 A | 11/1998 | Lysejko et al. | |
| 5,867,649 A | 2/1999 | Larson | |
| 5,963,944 A | 10/1999 | Adams | |
| 5,987,468 A | 11/1999 | Singh et al. | |
| 6,219,833 B1 | 4/2001 | Solomon et al. | |
| 6,651,065 B2 | 11/2003 | Brown et al. | |
| 6,993,763 B2 | 1/2006 | Hayes, Jr. | |
| 7,162,620 B2 | 1/2007 | Magoshi | |
| 7,263,536 B1 | 8/2007 | Pederson | |
| 7,523,130 B1 | 4/2009 | Meadway et al. | |
| 7,669,036 B2 | 2/2010 | Brown et al. | |
| 7,672,790 B2 | 3/2010 | McGraw et al. | |
| 7,730,113 B1 | 6/2010 | Payette et al. | |
| 7,743,189 B2 | 6/2010 | Brown et al. | |
| 7,751,805 B2 | 7/2010 | Neven et al. | |
| 8,239,938 B2 | 8/2012 | Simeral et al. | |
| 8,359,365 B2 | 1/2013 | Sitsky et al. | |
| 8,370,845 B1 | 2/2013 | Le Grand | |
| 8,396,838 B2 | 3/2013 | Brockway et al. | |
| 8,407,190 B2 | 3/2013 | Prahlad et al. | |
| 8,429,147 B1 | 4/2013 | Dutton et al. | |
| 8,429,165 B1 | 4/2013 | Jung et al. | |
| 8,491,384 B2 | 7/2013 | Tran et al. | |
| 8,499,025 B2 | 7/2013 | Howard | |
| 8,510,237 B2 | 8/2013 | Cascaval et al. | |
| 8,510,492 B2 | 8/2013 | Martchovsky | |
| 8,516,174 B2 | 8/2013 | Goerlich et al. | |
| 8,527,972 B2 | 9/2013 | Shimura | |
| 8,531,942 B2 | 9/2013 | Buttner et al. | |
| 8,533,717 B2 | 9/2013 | Kilian et al. | |
| 8,555,265 B2 | 10/2013 | Chambers et al. | |
| 8,819,694 B2 | 8/2014 | Corona | |
| 9,959,420 B2* | 5/2018 | Kiang | G06F 21/552 |
| 11,030,170 B2* | 6/2021 | Sitsky | G06F 16/22 |
| 2002/0009079 A1 | 1/2002 | Jungck et al. | |
| 2002/0029207 A1 | 3/2002 | Bakalash et al. | |
| 2003/0101099 A1 | 5/2003 | Sheltz et al. | |
| 2003/0167295 A1 | 9/2003 | Choo | |
| 2003/0182355 A1 | 9/2003 | Edahiro et al. | |
| 2003/0226108 A1 | 12/2003 | Oezgen | |
| 2004/0003039 A1* | 1/2004 | Humphrey | A63F 13/335 709/204 |
| 2004/0015978 A1 | 1/2004 | Orii | |
| 2004/0111552 A1 | 6/2004 | Arimilli et al. | |
| 2004/0215600 A1 | 10/2004 | Aridor et al. | |
| 2005/0131893 A1 | 6/2005 | Von Glan | |
| 2007/0073894 A1 | 3/2007 | Erickson et al. | |
| 2008/0030764 A1 | 2/2008 | Zhu et al. | |
| 2008/0059452 A1* | 3/2008 | Frank | G06F 16/338 707/999.005 |
| 2008/0080718 A1 | 4/2008 | Meijer et al. | |
| 2008/0082490 A1* | 4/2008 | MacLaurin | G06F 16/951 |
| 2008/0104609 A1 | 5/2008 | D'Amora et al. | |
| 2008/0143707 A1 | 6/2008 | Mitchell | |
| 2010/0005049 A1* | 1/2010 | Kawai | G06N 5/046 706/47 |
| 2010/0114899 A1* | 5/2010 | Guha | G06F 16/9535 707/E17.089 |
| 2010/0162261 A1 | 6/2010 | Shashidhara | |
| 2011/0047551 A1 | 2/2011 | Sitsky et al. | |
| 2011/0274329 A1 | 11/2011 | Mathew et al. | |
| 2012/0233130 A1 | 9/2012 | Vedachalam et al. | |
| 2012/0265762 A1* | 10/2012 | Wade | G06V 30/224 707/741 |
| 2012/0296891 A1 | 11/2012 | Rangan | |
| 2013/0021238 A1 | 1/2013 | Laufgraben | |
| 2013/0024424 A1 | 1/2013 | Prahlad et al. | |
| 2013/0028106 A1 | 1/2013 | Frost | |
| 2013/0060933 A1 | 3/2013 | Tung et al. | |
| 2013/0114107 A1 | 5/2013 | Park | |
| 2013/0127851 A1 | 5/2013 | Richards, Jr. | |
| 2013/0132468 A1 | 5/2013 | Azeez et al. | |
| 2013/0173499 A1 | 7/2013 | Cannon | |
| 2013/0205018 A1 | 8/2013 | Rahman et al. | |
| 2013/0212090 A1 | 8/2013 | Sperling et al. | |
| 2013/0231912 A1 | 9/2013 | Ye et al. | |
| 2013/0237200 A1 | 9/2013 | Nystrom et al. | |
| 2013/0238572 A1 | 9/2013 | Prahlad et al. | |
| 2013/0325873 A1 | 12/2013 | Sitsky et al. | |

FOREIGN PATENT DOCUMENTS

| | | | |
|---|---|---|---|
| WO | 03/079206 A1 | 9/2003 | |
| WO | 2009/102765 A2 | 8/2009 | |

OTHER PUBLICATIONS

International Search Report and Written Opinion dated Sep. 29, 2009, for International application No. PCT/US2009/033759 with International filing date Feb. 11, 2009 (8 pages).

* cited by examiner

SYSTEMS AND METHODS FOR SCALABLE DELOCALIZED INFORMATION GOVERNANCE

CROSS-REFERENCE TO RELATED APPLICATION

This patent application is a continuation of U.S. patent application Ser. No. 15/935,231, filed Mar. 26, 2018, which is a continuation of U.S. patent application Ser. No. 14/083,742, filed Nov. 19, 2013 (now U.S. Pat. No. 9,928,260), which is a continuation-in-part of U.S. patent application Ser. No. 13/961,030, filed Aug. 7, 2013 (now U.S. Pat. No. 9,785,700), which is a continuation-in-part of U.S. patent application Ser. No. 13/705,522, filed Dec. 5, 2012 (now U.S. Pat. No. 9,665,573), which application is a continuation of U.S. patent application Ser. No. 12/866,950, filed on Nov. 5, 2010 (now U.S. Pat. No. 8,359,365), which application is a National Stage Entry of PCT/US09/33759 with an International Filing Date of Feb. 11, 2009, which application claims priority to both U.S. Provisional Patent Application Ser. No. 61/027,600, filed Feb. 11, 2008, and U.S. Provisional Patent Application Ser. No. 61/027,603, filed Feb. 11, 2008, the contents of each of which are incorporated by reference.

FIELD OF THE INVENTION

The present disclosure generally relates to the field of electronic document indexing, and more particularly, to cloud-based document indexing in the area of electronic discovery and information governance.

BACKGROUND

Businesses use cloud computing services such as Microsoft's Office 365, Exchange On-line, SharePoint on-line, Google's Gmail, Google Drive or others to host and store billions of electronic items. Countless emails are sent and received daily. Workers routinely generate new documents and store them on cloud storage systems. Paper documents are scanned and sent by email. Many pictures and flat files are converted into digital text by optical character recognition. All this activity produces electronic data that is highly unstructured.

Cloud computing services offer the ability to create and keep that data in a storage system that is distributed across any number of storage servers, server storage and data centers. Any business's data may be arbitrarily complex. An exchange database file may contain millions of email messages, some which contain attachments like zip files or office documents. A zip file can contain office documents, an email message can contain attachments, which themselves may contain email that might even contain a PST file. Cloud computing services can distribute any and all of that material across numerous physical computers in a number of different datacenters. Such a storage structure hides the size and extent of the data.

Existing approaches to indexing cloud base data for eDiscovery often requires copying it all from the cloud, through a firewall, to a local "terrestrial" storage system for processing or indexing. This requires the maintenance of a physical non-cloud infrastructure (whether owned by the corporation or its litigation service provider) causing excessive delays in performing electronic discovery activities. The reason the mail is downloaded from the cloud is that efficient processing requires the processing computers to reside close to the data. Should the data and processing computers be remote, processing speed is limited by the size of the network connections, which slows processing to a crawl, introduces processing errors and which ultimately results in processing failure. Some eDiscovery service providers purport to be cloud-based services providers. However, those services are limited to legal hold, document review and rudimentary searching. To achieve the level of detail required to satisfy regulatory requests or litigation discovery, the data must be downloaded and processed (e.g., indexed). For example, cloud-based simple search capabilities will typically ignore non-text searchable documents such as PDF and TIFF files, password encrypted documents, corrupted items, attachments and embedded files, simple or complex zip-files, any of which may contain one or more such items, recursively. They will also provide limited or no search capability over images as companies look for pornography, illegal images, and intellectual property which has been pictorialized. The downloaded documents are processed, optical character recognition (OCR) is performed, password cracked, searched and analyzed and then a specific subset of documents may be loaded onto a review platform which may require uploading to the same or different cloud. However, the complex processing and structuring work is typically NOT completed in the cloud.

Such approaches result in excessive delays. One reason these analyses are slow is that all data must pass through the business's account with the cloud services provider, and the cloud services provider will typically provide a limited throughput per access point also called "throttling". It is further limited by bandwidth restrictions at the end user's location.

SUMMARY

This invention provides systems and methods for document indexing and electronic discovery in the cloud. Data is analyzed (e.g., indexed) within the data center where the data is stored or another other cloud data centers where (i) large quantities (greater than 20) of multicore virtual machines can be rented on an ad-hoc basis and (ii) where massive amounts of bandwidth are provided to enable rapid movement of data between data centers, is provided. This removes the requirement that the data be copied through a firewall to a local system. Methods and systems of the invention can be used to initiate processes that are in the cloud and thus have high-bandwidth access to instances of data to be indexed. Since cloud services may house data in storage distributed across many data centers, indexing is made rapid by indexing each instance of data in the cloud, either within the data center where it is housed or via another cloud resource. This strategy provides a cloud-based electronic discovery solution for the identification, collection, processing, search and analysis, review, and production of data held in the cloud by a solution also situated in the cloud. Additionally, since the various indexing processes may be run separately, the cloud service hosting the data may not recognize that the entire data store is being examined at once and will not throttle the bandwidth (i.e., compared to prior art ways of copying all of the data to a single destination behind the firewall, which causes the cloud service to throttle, or restrict, the connection leading to very slow copying speeds). Indexing in the cloud includes employing multi-core, or distributed multi-core electronic discovery computers which performs the act of processing or indexing the potentially relevant data in the cloud. Multi-core and distributed multi-core solutions are provided by the invention. Since processing hardware and software is located physically close to the data being indexed, the computational intensity of indexing does not corrupt or fail or take an inordinate length of time.

Systems and methods of the invention allow organizations to detect malfeasance very rapidly. Evidence of crimes or other bad behavior can be detected by rapidly indexing cloud-based data in the cloud. The invention provides tools for detecting and thwarting cyber-attacks. For example, some examples of cyber-attacks include viruses or malware that come to a server computer and replicate themselves, creating new material such as copies of themselves or points of entry for other, later cyber invasions. Indexing systems of the invention can detect these threats and reveal them before excessive damage is done.

Systems and methods of the invention take advantage of the cloud-based architectures and benefits including, for example, essentially limitless "burst" expansions and capabilities for processing, enhanced security, persistent and easily accessible storage, as well as additional processing power on-tap. Data to be indexed includes email as well as user documents and other material, as well as collections held on hosted products such as SharePoint. A user collection can include data held in other services such as Dropbox, Box.net, Salesforce.com, Amazon S2 and S3, bank and non-banking client accounts, Facebook, and others.

Systems of the invention are operable to work around the cloud vendor's throttling and achieve maximum throughput by achieving maximum bandwidth. Firstly, the system identifies in which datacenter the data resides (so that the system can initiate processes in the same datacenter or in a cloud location with a high bandwidth connection) and secondly, the system may access client email accounts using either the individual mailbox accounts and user-passwords, or by using a local site-specific administration account (e.g., so that not everything is funneled through a single global admin user). The described methodology spreads the load across a lot of access-points and may involve moving a copy of the data to a different part of the same datacenter, but most often eliminating the need for downloading anything at all. Even where data is not processed in the same one physical data center within which that data resides, systems and methods of the invention use other cloud infrastructure providers (e.g., Amazon) with bandwidth that produces desirable results by spreading the load (e.g., by using individual mailbox accounts and user-passwords, or by using a local site-specific administration account instead of a single global administration account).

The invention provides systems and methods for indexing data archives or storage systems by breaking the task up into work items and using one or more processes that are proximal to the task. Each process can determine whether to index data associated with the work item, to create a new work item and have a different process index the data, or a combination thereof. Since the secondary processes can each determine whether to process data or to call another process, the system performs an internal load-balancing that results in requesting additional cloud processes when data has unexpected complexity. This in-cloud load-balancing is well-suited to archives or storage systems in which electronic items are separated into components that are stored separately, that are associated with unpredictably complex embedded data, or both. For example, in a cloud-based storage system, electronic items may be emails, files, disk images, databases, other material, or a combination thereof, any of which may be broken up across multiple storage locations. Individually-stored components may have embedded data objects with more examples of the same electronic items (e.g., a PST may have emails in it, an email could have a PSTs or more often PDFs or zip files attached to it, etc.). As each of the multiple processes works on a work item, it may discover embedded data of any complexity and create new work items or even whole new jobs as needed. Because the most complex embedded data structures get allocated the most processes, stores of electronic items can be quickly reconstituted or indexed.

In particular, the load-balancing processes solve the problem whereby electronic items that are broken up and archived as separate components give no a priori clue as to how to allocate processes for indexing. Each process can request additional processes as it discovers data. Thus, using a plurality of processes of the invention to index electronic items such as emails that have been broken up and archived as components results in an indexing system that can index an enterprise-scale data store at a speed not previously known or expected. Actionable intelligence is provided from very large unstructured archives rapidly, with initial results becoming available often within minutes or hours of beginning a job instead of days or weeks.

Systems and methods of the invention can be used to analyze any form of storage in the cloud including archives, storage devices, whole storage systems, network storage solutions, and combinations thereof. A storage system can include multiple terabytes (e.g., 100 TB, 400 TB, 1 petabyte (PB), etc.) and can be implemented in the cloud.

Systems and methods of the invention are operable for (i) the indexing of archives and email systems in which electronic items are separated into components that are stored separately in different storage locations, that are associated with unpredictable embedded data, or both; and (ii) the indexing of storage systems where data is contained within multiple simple and complex containers, each potentially having electronic items separated into components and stored separately or where related documents and items can be stored in separate containers and where searching holistically over all containers and items via a compound index provides better search and insight. In some embodiments, an index is provided in a form of multiple indexes, each of the same structure as each other. An index thus may be a multi-component structure comprising a plurality of different, standalone indices that are provided and queried (e.g., by software in the indexing system). A query, such as a single logical data query, can retrieve data from across the plurality of linked but standalone indices in a single operation. In this way, the plurality of indices may all be combined logically to be queried to come up with an answer. Thus, systems and methods of the invention are operable to search over multiple unstructured containers, email accounts, fileshares, cloud-based SharePoint accounts etc., together in a storage system with same functionality from the point of view of a user as searching over the content in an archive.

In certain aspects, the invention provides a method for indexing a storage system that includes many items, all stored among different data centers. The storage system is indexed by accessing each item with a process in the cloud (i.e., within the data center where that item is stored or from another cloud resources) and using the process in the cloud to index that item, collecting results from indexing the plurality of items at a control computer, and providing a master index with all of the results, thereby allowing a user to find material within the storage system by using the master index. The process used to index an item may be executed within the data center where that item is stored or may be executed within a second data center that has a high-bandwidth connection to the data center. The process may be executed using a server provided by the cloud computing service that is storing the time, or the process may be executed by a second cloud computing service. For example, the Microsoft Azure cloud computing service can be used to index Office365; Google Compute could be used to index Gmail; Amazon AWS could be used to index any other cloud computing service, etc. The different items can be accessed using credentials or passwords associate with the item or a containing account. The items may include email accounts; documents; folders; and items that are not text-searchable such as, for example, PDF-formatted files and image files. Indexing items that are not text searchable may involve performing a character recognition operation on those items to generate text and identifying character strings within the text.

The different data centers may be separate buildings housing storage computers. The indexing happens in the cloud on data stored in the cloud and the data centers may themselves each be part of one or multiple cloud computing service. In some embodiments, each local process used to index the items is provided by the cloud computing service. Generally, each item is stored in one of the plurality of data centers within a computer device that includes a non-transitory memory. Typically, the control computer will be a computer device that includes a physical processor coupled to a non-transitory memory.

Aspects of the invention provide a system for indexing a storage system that uses a control computer operable to coordinate an indexing operation of a storage system that includes numerous items, each item stored in one of a plurality of data centers, by accessing each item within the data center where that item is stored and causing a cloud process to index that item. Results from the indexing are collected by the control computer, which then provides a master index comprising all of the results, thereby allowing a user to find material within the storage system by using the master index.

In methods and systems of the invention, the control computer may be operable to initiate the indexing project in which each cloud process determines whether to index an item directly or to itself cause a second cloud process to index the item.

In other aspects, the invention provides a method for indexing a storage system that includes items stored across a number of data centers provided by a cloud computing service. Storage within each data center is accessed using credentials recognized by the cloud computing service, and items within the accessed storage are each indexed using a cloud process within that data center or provided by another cloud service. Results of the indexing are compiled to provide an index showing locations of items within the storage system. Preferably, each cloud process determines whether to index an item directly or to initiate indexing the item by a second cloud process and, upon so determining, causes the second cloud process to directly index the item. The indexing can be done by processes provided by the cloud computing service itself, or can be done using a second cloud computing service to operate each cloud process, or a combination thereof.

In some aspects, the invention provides an indexing system for indexing a digital storage system. The indexing system includes a control computer (with a physical processor coupled to a tangible, non-transitory memory) operable to index a storage system. The storage system includes a plurality of items each stored in one of a plurality of data centers. The control computer is operable to initiate, for each item, causing a cloud process for that item to determine whether to index that item or to cause a second cloud process to index that item. In general, a cloud process refers to an instance of program execution occurring in a server computer remote from a user's point of access, and typically occurring within at least one server computer of many similarly-configured server computers being offered in the aggregate as a service for storage, processing, or both by a service provider to a user with the understanding that the user then need not purchase the many similarly-configured server computers, but can instead pay the service provided a fee for use of the cloud service. The control computer is operable to aggregate results generated by the initiation to produce an index of the storage system. In illustrative examples, the digital storage system comprises a cloud email or email achieve system and the plurality of items include email accounts. The index of the storage system may be a database wherein an entry within the database corresponds to the email message and specifies the location of the plurality of components. In some embodiments, each cloud process operates within a virtual machine.

In a preferred embodiment, each cloud process determines whether to index that item based on a characteristic of that item. That characteristic may be, for example, the presence of an attachment or the presence of certain metadata. In general, the storage system will include storage provided by a cloud computing service.

In certain aspects, the invention provides a computer indexing system for indexing, in the cloud, an electronic storage system in the cloud. The indexing system preferably includes a control computer. The indexing system may operate via one or a plurality of virtual machines and the processing capabilities provided by each virtual machine. Virtual machines may be allocated by a control system such as a hypervisor module. The indexing system is operable to scan a storage system comprising electronic items and create a work item for each item. A cloud process is operable to receive a first work item for a first item, determine characteristics of embedded data within the first item, and use the determined characteristics to further determine whether to index the first item or to create a new work item referencing the first item and send the new work item to a different cloud process. The control computer aggregates results generated by the plurality of cloud processes and produces an aggregate comprising an index.

In some embodiments, the storage system comprises an email archive or an email mailbox and the electronic item is an email message. The storage system may include a database in which an entry within the database corresponds to the email message and specifies the location of the plurality of components. The email may be stored as components such as recipients, metadata, body text, attachments, or system index and the component, as stored within the database may have, as embedded data, an item that was attached to the email (e.g., a zip file that includes a word-processing document, which has an inserted picture). A cloud process can determine a characteristic of the embedded data (e.g., the presence of a file inserted into a word document that is located within a zip file) to determine whether to index that embedded data or create a new work item.

In some embodiments, systems and methods of the invention can be set to operate at one of multiple different levels. A level may refer to an amount of time, complexity, thoroughness, or data level of a job and may particularly be defined to relate to levels of embedding, selection of certain contents or metadata, or a combination thereof. For example, the invention may employ a multiple definition of index. To illustrate, a lite index could refer to results of an indexing job performed down to the metadata level of all the documents and attachments, optionally including an MD5 fingerprint whereas a full text index relates to indexing metadata and all the text of all the documents held across an entire storage system (e.g., within all the archives, file shares, DMSs etc. in a SAN or cloud storage system). In certain embodiments, systems and methods of the invention are implemented to provide "living indexes" and it may be preferable for a living index to be at the defined lite level. A living, lite index may refer to the output of a system and method of continuously indexing across a storage system, preferably performing the indexing down to the level of metadata of documents, files, objects, or attachments.

Another use case of cloud-based massively parallel processing abilities is where a time-limited subset of data such as, all the data created and received in the last 24 hours, (or 48 hours, 7 days or even 5-15 minutes) is indexed to make specific searches, the answers to which hold value to the employer. Examples include a pharmacy company checking for the leakage of client or employee information such as personally identifiable information, credit card details or indeed information about the client's health. Similarly a bank may want to check for potential information leaks about upcoming but not yet announced deals, through email monitoring like this.

DETAILED DESCRIPTION

The present disclosure generally relates to the field of electronic document indexing of data stored in the cloud, and more particularly, to indexing in the cloud the data stored in the cloud. Clouds include datacenters or multiple datacenters linked together with massive bandwidth. This invention identifies where the data resides (i.e., which country or datacenter) and provisions (or collocates) the appropriate amount of "burst" hardware to index the data in each datacenter or geography so as to process the data in the least amount of time possible (e.g., for Office365, the process could be to run in the Microsoft Azure platform; for Gmail, the process could be to run on Google's Compute Engine; and for others, Amazon AWS could host). The invention includes the ability to federate a search across a globally distributed collection of indexes as if they were all located in a single location. Systems and methods of the invention leverage cloud based, virtualized infrastructure to eliminate data movement through dynamically allocating and remounting virtual disks.

Figure 1:
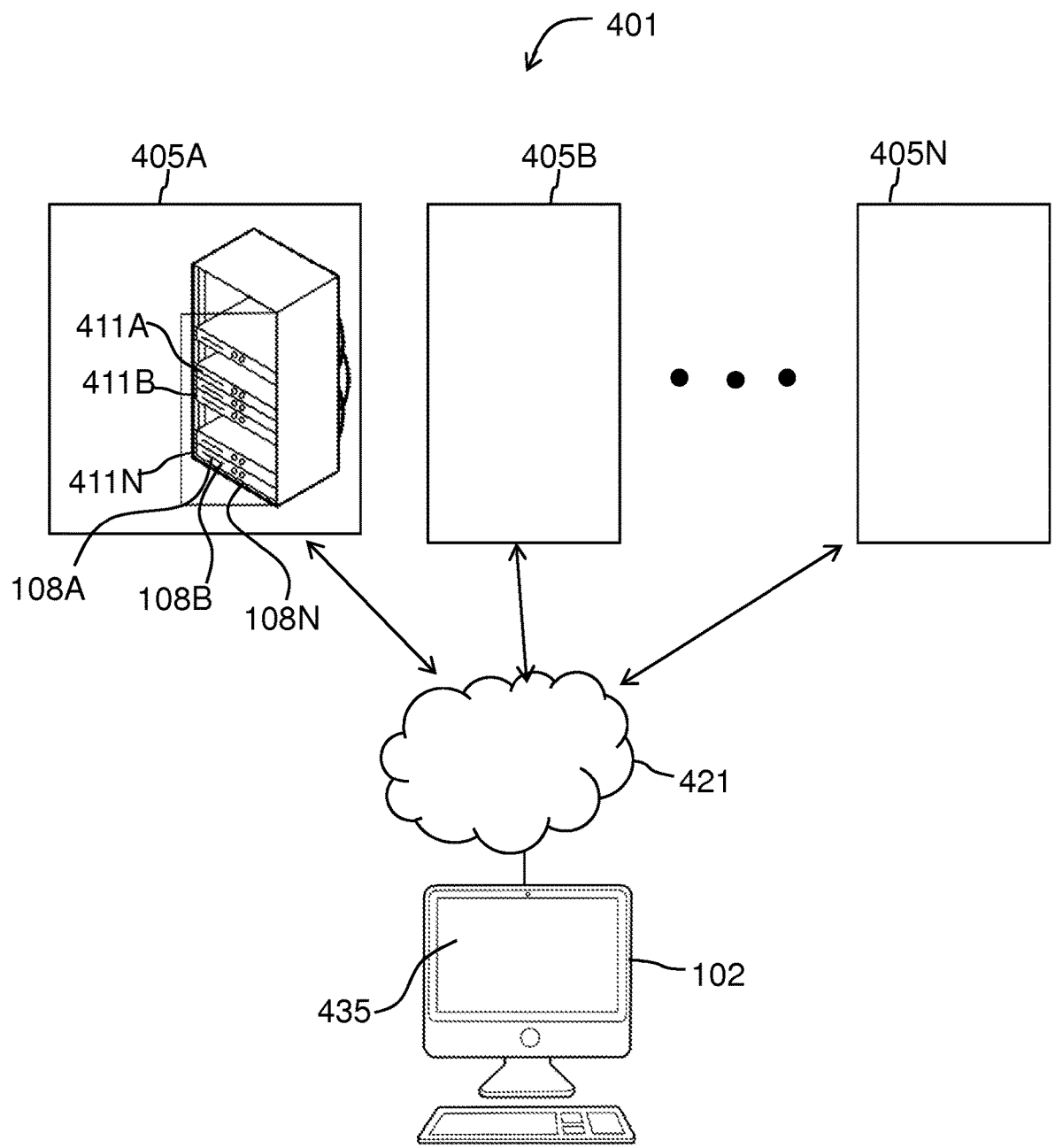
FIG. 1 gives a high level diagram of a system for indexing in the cloud.

FIG. 1 gives a high level diagram of a system 401 for indexing in the cloud. System 401 may be accessed via a control computer 102. The control computer may be a laptop or desktop computer with input/output devices such as a display 435 plus keyboard, mouse or trackpad, touchpad, touchscreen, or others. Control computer 102 may be provided by a server that is, in turn, accessed via a laptop, desktop, tablet, or other computer. In the latter case, the access computer will generally provide display 435, even where control computer 102 is a server-side computer such as a Hitachi Blade or other server computer. Generally, control computer 102 will have a physical processor coupled to a memory and will contain program instructions that make system 401 operable to index a cloud-based storage system in the cloud.

The cloud service, and the storage system being hosted in the cloud by the cloud service, may use one or a plurality of different data centers 405. Data items within the storage system may each be stored in different ones of the data centers 405. Generally, a cloud service's data centers 405 will each include a plurality of servers 411 (local in that the servers 411 are located within a given data center 405).

As diagramed in FIG. 1, control computer 102 can communicate over network 421 to communicate with servers 411 in each data center 405. Using a process 108 executed on a server 411, system 401 can access an item within the data center 405 where that item is housed and index that item using indexing methodologies described in more detail herein. A process 108 is an instance of computer instructions being executed. To illustrate, in UNIX/LINUX, the command ps returns a list of process being executed. Within a desktop environment provided by Microsoft WINDOWS, the task manager—in the Processes tab—shows a list of processes being executed. Control computer 102 can also be used to collect the results produced by each process 108 as it indexes an item. Control computer 102 can collect the results and compile a master index that can be accessed by a user by, for example, going through interface 435.

Figure 2:
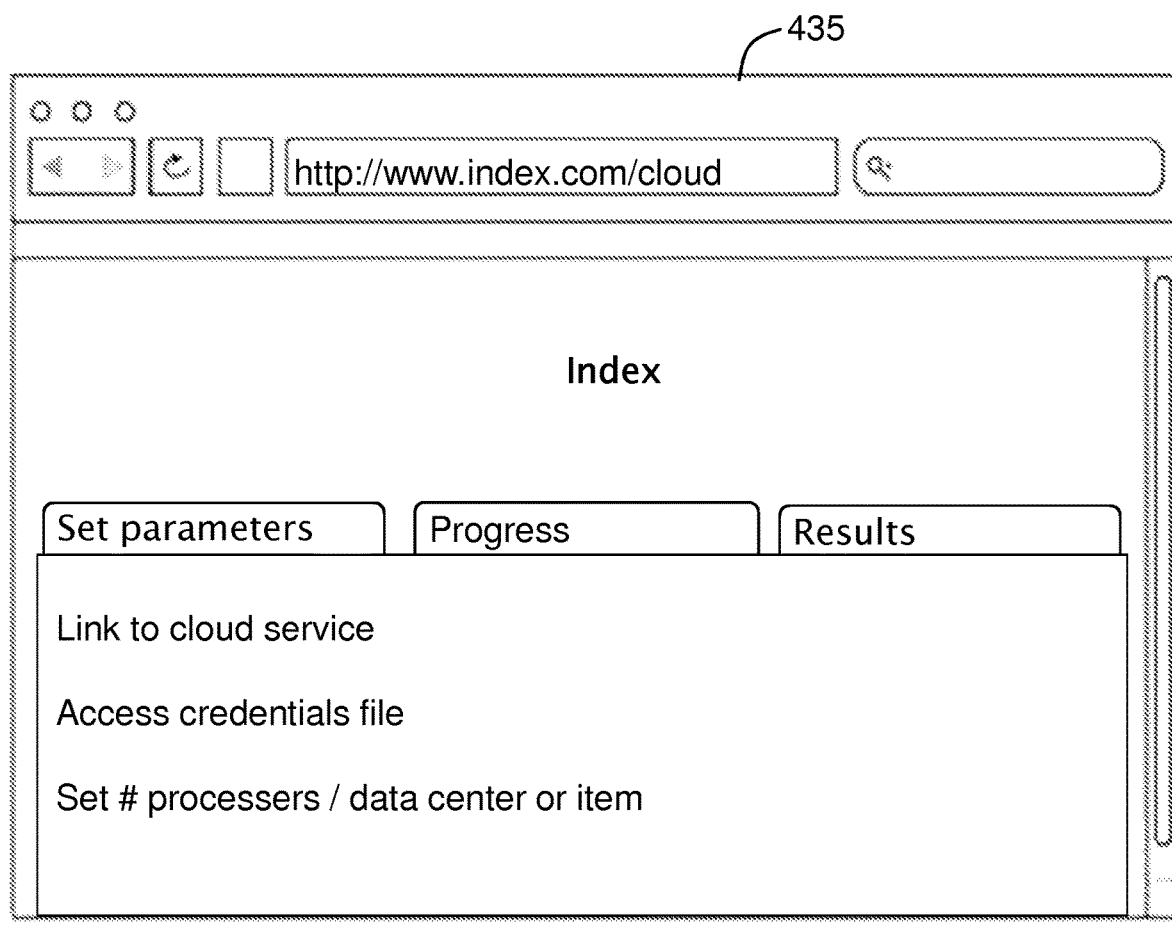
FIG. 2 depicts an exemplary interface for initiating an indexing project.

FIG. 2 depicts an exemplary interface 435 for initiating an indexing project via control computer 102. In the depicted embodiment, a web-based interface is provided and a user can use a web page in a web browser program to set job parameters, monitor job progress, or obtain a view into the master index comprising all of the compiled results from the indexing instances.

Setting the parameters allows the user to influence how indexing will proceed. For example, the user can link to a cloud service where there is data to be indexed and can use processes 108 within the cloud to perform the indexing. The user can access a credentials file (e.g., by uploading a password file that has been provided by a sys admin, or by connecting to a master file of account keys, or other similar methods), allowing system 401 to use processes 108 to index data in the data centers 405. Interface 435 can also be used to control parameters of the job relating to a number of processes 108 to use or which data centers 405 or items to include or exclude in the indexing project.

Efficiency and throughput is achieved by having individual processes 108 participate in load-balancing methodologies disclosed herein whereby an individual process 108 acts as a master and initiates instances of other individual processes 108 indexing items as those items are discovered embedded within data items. The front end interface (e.g., as exemplified in FIG. 2 or other versions) can be provided using HTML, and JAVA or other programming methodologies. The indexing operations can employ cloud services such as RESTFul API (e.g. Windows Azure RESTFul API) or Amazon AWS to operate the actual indexing. The interface 435 and control over operations can be developed in an environment such as .Net (e.g., C #) or Groovy and Grails. As needed for implementing modules or functionality herein, a scripting language such as Ruby scripting may be employed. Data results and data structures may be collected and stored using SQL Based Technologies. In general, control computer 102 may be a mac, Windows, or Linux based computer or any other computing device capable of displaying interface 435. While the load-balancing logistics employed by system 401 is discussed in greater detail below, an individual process 108 may make a decision to index or not to index items discovered within items and pass those items off to another process 108 that itself makes a decision. This load balancing is recursive according to the nature of the data being indexed.

Figure 3:
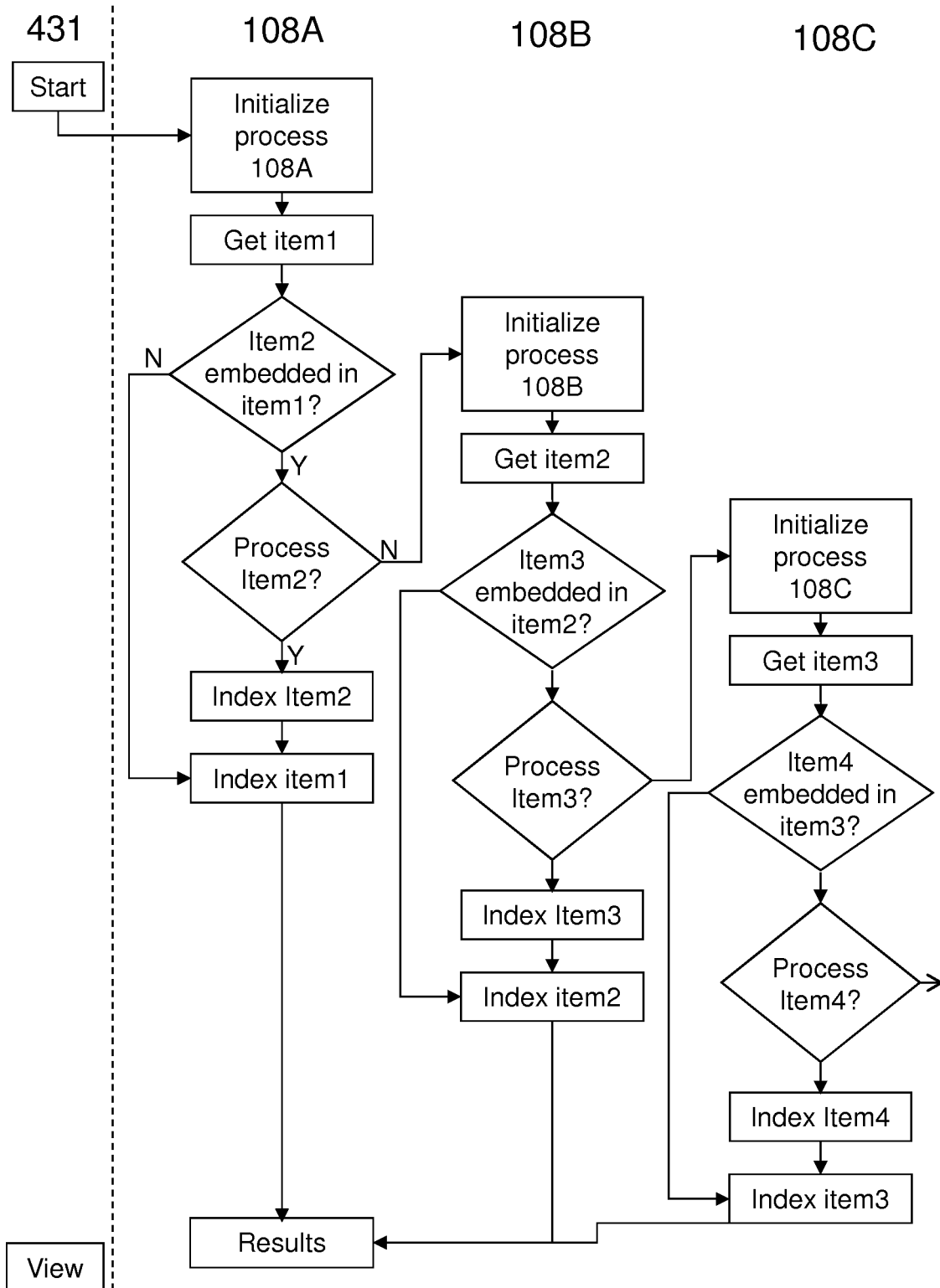
FIG. 3 illustrates load balancing by processes.

FIG. 3 illustrates load balancing as it may take place within a data center 405 where an item is being indexed. Once the indexing is started, a process 108 a is initiated and gets an item1 to index. Process 108 a determines if item1 has an item2 embedded within it. If so, process 108 a determines whether or not process 411 a itself will index item2. This determination may be based on a size or complexity of item2, or the size or complexity of item2 in view of the size or complexity of item1, a job schedule, other data, or a combination thereof. If process 108 a determines not to index item2, process 108 a initializes process 108 b. If process 108 a determines to index item2, process 108 a then indexes item2. Processor 411 a then indexes item1.

If process 108 a determined not to index item2, then process 108 b determines if item2 has an item3 embedded within it. If so, process 108 b determines whether or not process 108 b itself will index item3. This determination may be based on a size or complexity of item3, or the size or complexity of item3 in view of the size or complexity of item 1 or item2 or both, a job schedule, other data, or a combination thereof. If process 108 b determines not to index item3, process 108 b initializes process 108 c. If process 108 b determines to index item3, process 108 b then indexes item3. Processor 411 b then indexes item2.

If process 108 b determined not to index item3, then process 108 c determines if item3 has an item4 embedded within it. If so, process 108 c determines whether or not process 108 c itself will index item4. This determination may be based on a size or complexity of item4, or the size or complexity of item4 in view of the size or complexity of other items, a job schedule, other data, or a combination thereof. If process 108 c determines not to index item4, process 108 c initializes process 108 d (not pictured). If process 108 c determines to index item4, process 108 c then indexes item4. Processor 411 c then indexes item3. One of skill in the art will appreciate that the described process is recursive and may include any suitable number of processors as provided by a cloud resource.

This load balancing methodology provides speed and scalability not previously provided. This creates the availability of advanced search functionality in the cloud. This also supports an easy costing model. The processing is notable for working entirely where the client's data is. The client's data can be indexed using only the cloud resources and the client need not purchase and maintain expensive new hardware to index an entire enterprise's worth of data.

This completely cloud-based indexing results in a massive decrease in time to access data and results can be provided soon after as indexing is begun. As the results are compiled into a master index, a variety of electronic discovery type activities can occur: culling, de-duplication, search, tagging etc.

The invention provides the ability to process data from a multitude of cloud sources. The invention makes use of the parallel processing framework and worker mapping to simulate many (e.g., hundreds) of user sessions to overcome systematic bandwidth throttling performed by online email service providers. Systems and methods of the invention can be used for forensic and corporate based investigations, e-Discovery and regulatory disputes or investigations; as well as criminal and civil legal matter investigations. Additionally, the invention provides valuable tools for information governance, and can be used in the monitoring, migration, or culling of data. (As noted in the examples, previously "un-found" data and emails can be found; also, duplicate records can be identified.) System and methods of the invention support litigation readiness and aid in the identification of company records in the cloud. The invention may be used for the identification of Privacy information including Personally Identifiable Information (PII), PCI (Credit Card information) and PHI (Personal Health Information) which is stored in non-secure environments. These resources and tools will allow organizations to save money on eDiscovery and investigation and, ultimately, bad guys will be caught quicker.

As discussed above, the invention provides methods of indexing data items. The methods can include filtering data items. Filtering can be done by custodian, kind (i.e., whether as loose files and document, emails, attachment or by individual format type), email types (e.g., .msg, eml, .nsf), calendar item, contact, document type (e.g., .pdf, .ps, .pub, .doc, .xml, .xps), spread sheet types (e.g., .xls, .ods, .xlsb, .xlsx), presentation types, the presence or types of drawings or multi-media files, databases or containers as discussed below, the lack of data items, unrecognized files, or irregular items (e.g., corrupted containers, non-searchable PDFs, bad extensions, unrecognized, unsupported, empty, encrypted, decrypted, deleted, corrupted, text stripped etc.). Other types of actions that may be used are sorting, filtering, or categorizing including on comments already made about the individual items, skin tone analysis for images (severe, high, medium, low), identification of languages (i.e. all of them), hash matching etc.

Embodiments of the invention include recognizing a priority of identification of important information. For example, using techniques such as regular expressions or pattern matching, certain types of information can be flagged for priority treatment. Such types of priority information can include credit card numbers, social security numbers, currencies and amounts, geographical locations, IP addresses, email addresses, physical addresses, company names, ticker symbols, and others.

The invention provides for a variety of types of, and strategies for, searching. An illustrative list of searches include: searches text content only; searches on the name of the item; searches on the MIME type of the item; searches for the short ID that is unique for this case; searches for items of the same size; searches for audited items of the same size; searches over the property names and values associated with every item of data; searches over the whole number properties associated with every item of data; searches over the fractional number properties associated with every item of data; searches over the date properties associated with every item of data; searches over item contents but returns the associated top-level item for any hits; searches over item names but returns the associated top-level item for any hits; searches over the property names and values associated with every item of data, but returns the associated top-level item for any hits; searches over the name, content, property names and values associated with every item of data, but returns the associated top-level item for any hits; searches for an item by the date of the item (the date of the item will generally be the same as the communication date for items which represent a communication and the modified date for other types of item, items without a date inherit the date of their parent); searches for characters from particular writing systems; searches on the digests of data items; searches over custom evidence metadata which the investigator attached when choosing the evidence data to load; searches over the file extensions detected over all items; and searches on whether items have or do not have binary data. Systems and methods of the invention can be used to perform a variety of tests such as, for example: tests if this item type may contain text data; tests if this item has image data; tests if this item has communication data; and tests if this item has embedded data. The invention may be used to identify items that satisfy certain matching criteria such as, for example: exact duplicates; matches items where one of the ancestors of the item has the provided name; matches items where one of the ancestors of the item contains the specified kind of data (similar to using the path-mime-type field, but simpler to use); matches items where one of the ancestors of the item has the provided MIME type; matches items which have been encrypted; matches items which contain the specified characters; matches items that contain text in specified languages; and others. Results from an indexing operation of the method can be exported to all major litigation review platforms (i.e. Relativity, Ringtail, Concordance etc. ... ) in all formats (i.e. native, PDF, Tiff, text and Nuix subcases). Results can also be viewed in a proprietary review platform.

Central to the robust and rapid indexing provided by the invention is the operation of processes (e.g., as described in FIG. 3) to index data. The term "data" shall refer to any collection of numbers, characters, images, instructions, or other forms of information in an electronic format. Examples of data may include, but are not limited to, an exchangeable database file, a disk image file, electronic documents, electronic mail messages, PST files, an electronic document embedded within another file, and a directory containing millions of office documents.

Systems are operable to process data from a single file (i.e. a word doc or email) or to re-assemble data from multiple files to form a copy of the original single data item. This is useful when the storage/imaging systems stores different parts of a file in different places (which sometimes happens). Some examples:

Disk images—items are often segmented/spread across multiple disk blocks.

EDB/STM files—often the email's data record refers to ("points to") an associated record, e.g., RFC822 text in an STM ("stream") file (i.e. needing to merge two or more data files to create a copy of the original).

Additionally, systems and methods of the invention are provided for complex processing. For example, some structures such as Symantec Vault/EMC email Extender (i.e. big archives) involve databases such as Microsoft SQL Server which point to the location of components of the data. System and methods of the invention can read the database records to discern the locations of those components, find the components, and re-assemble the data streams into the original items (e.g., making a new copy or new index of an archived email). An extension of this problem comes up when an archive (e.g., Symantec's Vault) uses single instance imaging (i.e. where just one copy of an email or attachment is kept rather than many for storage optimization). The database keeps track of where the original attachment, email body, other component(s), or a combination thereof is located, and systems and methods of the invention—by including the database in the indexing process— re-assembles the data appropriately by inspecting the item's record(s) in the database. Thus, systems and methods of the invention are operable to contact a database within an archive system, wherein the database indicates locations of components of archived items. Moreover, systems and methods of the invention are operable to assemble or index those items even where data is stored via single instance imaging.

In certain embodiments, the invention provides systems and methods for indexing only recently-changed content of a storage system. This may be referred to as, "scanning for new child items within an already indexed dataset and indexing the new items only." This allows systems and methods of the invention to access a dataset (e.g., reload a complex archive such as a mail server or compliance storage system including, for example, an updated .NSF/.EDB file), find new child items, and load the new child items into the right place in an existing "data tree" in the existing case. All existing items, GUIDs (internal identifiers), and annotations are preserved. When a specific item of data is loaded, systems specify exactly which part of the data tree it should occupy. This means that new child-items can be found, indexed, and slotted into the appropriate (i.e. correct spot) in the index—keeping everything else in place.

In some embodiments, systems and methods of the invention perform a preliminary scan over a large data set that is less exhaustive than a full indexing job, and allows a user to select a subset of the overall data archive based on the results of the preliminary scan. The system can then exhaustively index the subset selected by the user. This can be described as doing a "quick metadata scan" over a large data set quickly, allowing an investigator to narrow down the items of interest, and reloading the items of interest with "richer" process settings without moving those items of interest (i.e. leaving them in place) for a deeper investigation. Prior art systems copied the items of interest or removed them from the archive being indexed. In contrast, systems and methods of the invention do the enriched, exhaustive search in place. This allows indexing to proceed more rapidly and less obtrusively, as target data does not need to be pulled out of the business enterprise's existing cloud systems.

In certain embodiments, systems and methods of the invention operate at one of multiple different levels. A level may refer to complexity or data level of a job and may particularly relate to levels of embedding, selection of certain contents or metadata, or a combination thereof. For example, multiple definitions of an index may be used and a computer indexing system can be set to operate to produce the index of a selected definition. To illustrate, a lite index could refer to results of an indexing job performed down to the metadata level of all the documents and attachments including an MD5 fingerprint whereas a full text index relates to indexing metadata and all the text of all the documents held across an entire storage system (e.g., within all the archives, file shares, DMSs etc. in a SAN, on a storage volume in the cloud).

In certain embodiments, systems and methods of the invention are implemented to provide living indexes that include data being continuously refreshed or updated by an indexing system of the invention. In a preferred embodiment, a living index is provided at a lite level. A living, lite index may refer to the output of a system and method of continuously indexing across a storage system, preferably performing the indexing down to the level of metadata of documents, files, objects, or attachments.

In certain embodiments, systems and methods of the invention provide a data indexing system and method to thoroughly index vast quantities of unstructured data in place and within a reasonable time. The invention includes the insight that data repositories hold massive volumes of unstructured "dark data" in a variety of formats and storage systems. As a rough approximation for a general description, levels of complexity in data storage could be described, from simplest to more complex, as: (i) text or html; (ii) document; (iii) containers; (iv) complex containers; (v) massive, complex containers; and (vi) compliance storage systems. Text and HTML can include, for example, log files, web pages, or social networking posts such as posts on the web site Twitter.

Documents may contain text or HTML, metadata, formatting and embedded content. The common formats include word processing documents, spreadsheets, and presentations.

Containers can be structures of varying complexity designed to embed large numbers of items, with accompanying metadata. Existing indexing engines don't often extract content embedded within these files or don't deal well with the complexities of the formats. Examples of containers include folders, compressed (e.g., zip, tar) files, disk images, and single-user email databases such as PST, OST, NSF and mbox files.

Complex containers, which may be, for example, multiple-user email databases, contain even deeper levels of embedding and more complex metadata. They can reach many terabytes in size and contain millions of embedded items. Examples of complex containers include databases from the mail server sold under the trademark EXCHANGE by Microsoft Corporation (Redmond, Wash.), the business application platform sold under the trademark LOTUS DOMINO by IBM Corporation (Armonk, N.Y.), and the software platform sold under the trademark GROUPWISE by Novell, Inc. (Provo, Utah), as well as large file systems that contain embedded containers and other complex containers.

Massive, complex containers include enterprise-scale systems that wrap proprietary containers around each file or email message they store. These systems are so complex they require database lookups to locate text, metadata and attachments, which are typically stored separately. While they provide native searching capabilities, these are almost never designed with the needs of electronic discovery, investigation or information governance in mind. Examples of massive, complex containers include email archives, content management systems, or items from content management platforms such as the platform sold under the trademark SHAREPOINT by Microsoft Corporation (Redmond, Wash.) or Symantec Vault by Symantec Corporation (Mountain View, Calif.).

Compliance storage systems can include, for example, "write once, read many" (WORM) storage repositories that obfuscate content by adding additional layers of proprietary wrappers around the data stored in them. Many organizations that face retention regulations have invested in compliance storage systems to ensure data, once stored, cannot be tampered with. Generally, since data stored in these systems cannot be deleted, organizations looking to remove redundant, outdated or trivial data must instead identify the valuable data and migrate it to a new platform enabling them to then turn off the legacy system Examples of compliance storage systems include the content-addressable storage (CAS) platform sold under the trademark CENTERA by EMC Corporation (Hopkinton, Mass.) or the non-erasable compliance storage software sold under the trademark SNAPLOCK COMPLIANCE by NetApp (Sunnyvale, Calif).

A data storage system indexed by the invention can include components for network attached storage (NAS). A NAS uses file-based protocols such as NFS or SMB/CIFS and preferably the storage is remote. In a NAS, computers request a portion of an abstract file rather than a disk block.

In general, more complex storage systems store larger volumes of data but lack the capability to search, index, access, or manage it. In particular, complex storage systems do not cooperate well with existing external indexing applications.

Systems and methods of the invention are operable to provide various service methodologies including, for example, deleting data that has no business value; identifying and preventing potential privacy breaches; locating and automatically classifying company records in the wild; intelligently migrating important data to lower-cost or more flexible repositories (e.g., cloud storage) identifying computer viruses that are spreading, creating cyber security issues and vulnerabilities; or proactively mining data for valuable information. Any indexing operation can be accompanied by copy, show, delete, delete "all but", or similar operations for results that match search one or more search criterion. Search criteria can include testing for certain values in metadata (e.g., created or modified on, before, after, or within a certain date or date range; created or modified by a certain user, having certain read, write, execute permissions; containing certain content types such as picture files or videos; etc.). Additionally, matching criteria for electronic items being indexed can be specified through the use of regular expressions, which can be applied to document contents, embedded data, or a combination thereof. For example, all electronic items accessed by user John Smith that contain a character string matching/(S|s)ell [0-9] {0-4} shares.* ([A-Z] {2-3})/ can be operated on (e.g., copied to a new storage device). Moreover, in the previous example, all instances of matches can be indexed by the $2 value returned by the pattern matching, thereby indexing sell orders by ticker symbol and copying all records of those sell orders to a separate disk drive. This example is given for illustration and is not limiting. For example, a delete "all but" operation can be used on a copy of an archive to create a version that is indexed and includes only emails sent by a certain user.

Systems and methods of the invention operate to go to the data in the cloud. In some embodiments, the data is the property of an independent firm and the indexing system and method is operated by a service provider. The service provider can index the data from the cloud, which provides the additional benefit of a minimal hardware footprint. In some embodiments, indexing can be performed in a hybrid in situ, local copy model. Any specified subset of the target archive can be copied onto storage and index there, while the remainder is indexed in situ within the archive. In some embodiments, the indexing itself determines whether certain material is copied into a secondary storage device (e.g., into storage of the indexing system). If certain material, items, or embedded data satisfy a user's criteria, that material can be copied into the storage.

The invention provides systems and methods for load-balancing, fault tolerance, and intelligent processing.

Load balancing includes multiple parallel processes and a system of messaging between processes. In some embodiments, the system includes a control computer 102 and a plurality of processes 108 as well as a system of messaging between the processes 108 and control computer 102.

Control computer 102 distributes tasks to the processes 108 in the cloud. Each process 108 reports back when it has completed a task, and control computer 102 sends it a new task or process 108 takes a next task from a queue. This ensures all available hardware remains as close as possible to full utilization until all the tasks are finished, which minimizes the hardware footprint. It also maximizes scalability; the more processes 108 available together with sufficient memory, the faster the system can complete the task. This load balancing provides a dynamic and flexible approach to allocating tasks.

Fault tolerance according to the invention ensures that the system processes all tasks that are fed into it. Some tasks, such as corrupt files, can cause a process to crash. Some tasks just fail for no obvious reason. If a task fails, it will roll back to a stable state and restart. If a task fails multiple times, it can be marked as unreadable. If the system encounters corrupt or unreadable files, it simply picks up where it left off. Every single electronic item in an archive is indexed in great detail, or it is marked as unreadable (e.g., for physically corrupt or absent material). Systems and methods of the invention recovery seamlessly whenever an individual process 108 fails, without losing data.

Intelligent processing can include multiple queues. For example, a system may operate from a job queue from the archive and employ one or more internal work queues. In some embodiments, control computer 102 maintains a job queue and a work item queue. The job queue contains items delivered from a file system—these may be individual loose files; complex files with embedded components, such as zip files; or even entire email databases or forensic images. The work item queue contains individual items that a single process can manage, such as an email message or a Word document.

Systems and methods of the invention provide secondary processes 108 that can make intelligent decisions about each task they receive. If it is an individual item, they process it directly. If it contains multiple individual items, the process 108 can either index these directly or break the file into its components and add these to the work item queue. Each cloud process 108 makes this decision based on a number of heuristics. If a task contains multiple compound items, the cloud process 108 can add these to the job queue. This ensures that the system processes compound files and embedded items with forensic thoroughness and as quickly as possible. The load-balancing cloud processes 108 provide an additional benefit of more comprehensive and thorough indexing than prior art systems. In systems and methods of the inventions, the cloud processes 108 are operable to detect where an item to be indexed is associated with embedded data and to create a new work item for the embedded data, causing a second cloud process 108 to index the embedded data. If the embedded data (ED1) has data embedded within it (ED2, i.e., ED2 is embedded data within embedded data ED1), the second cloud process 108 will discover the ED2 embedded data and create new work item for that (ED2). This process is fully recursive.

To illustrate, a business enterprise may have an archive stored in a cloud. One electronic item within that archive may be a disk image of a hard drive from a retired email server. The disk image may contain an email database in which messages are broken up into components. One entry in the email database may be an email message that had an attachment (the attachment, the other components of the email, and the database entry may all be on separate data-centers within the cloud), and the attachment may, itself, be an email message. The email message that was an attachment may not be an entry in the email database. The email message that was an attachment may itself further have an attachment. The attachment embedded in the email message that was an attachment may be a presentation file from a presentation program such as the one sold under the trademark POWERPOINT by Microsoft Corporation (Redmond, Wash.). Slides within the presentation file may include jpeg files that were inserted. One jpeg file within the presentation file may include a hidden embedded watermark identifying a copyright owner of the jpeg picture content.

In this example, there are several levels of embedded data, as follows: cloud>archive>disk image>email database>email 1 entry in database>email 2 attached to email 1>presentation file attached to email 2>jpeg file in presentation file>digital watermark in jpeg file. Some prior art systems would have indexed only to some arbitrary depth of this recursive structure, having no mechanism for plucking an electronic item from within the structure and treating it as having equal status as any other item from within the structure while also remembering the proper location of the item from within the recursive structure. Systems and methods of the invention are operable to determine the presence of each instance of embedded data and create an associated work item, with all work items being co-equal.

As applied to the just-described example, the indexing job will not end with the top-level content of the email database (i.e., discovering only email 1). Systems and methods of the invention will go on to discover, and index (i.e. using either lite or full-text options), email 2 as well as the presentation file attached to email 2. As a result, an indexing job performed using systems and methods of the invention will show that email 2 went from its sender to its recipient with the presentation file attached and further that the presentation had the specifically digitally-watermarked jpeg file therein. By such a mechanism, systems and methods of the invention may uncover numerous electronic items that prior art systems do not find.

These capabilities ensure that the system extracts the maximum performance from server hardware when processing all kinds of unstructured data.

In addition to its massive parallel processing capabilities, systems and methods of the invention provide tools for accessing information in, and understanding, complex file and storage types such as email databases and archives, forensic images and WORM storage. This makes it possible for the system to process all layers of unstructured data—in situ and behind the firewall and in-site in the cloud—cracking open the formats of the largest and most complex storage containers to extract the content inside them.

Without this capability, indexing systems are restricted to scanning for loose text or extracting data through application programming interfaces, which are slow and can only supply a limited amount of data and metadata. This means the system finds data that other systems miss.

Systems and methods of the invention can process more than 100 million email messages and attachments per day. Systems and methods of the invention delivers near-linear scalability in multi-socket servers with multi-core processors. Systems and methods of the invention use a deep understanding of files, file-structures and text and metadata extraction to provide high-quality indexing.

Figure 4:
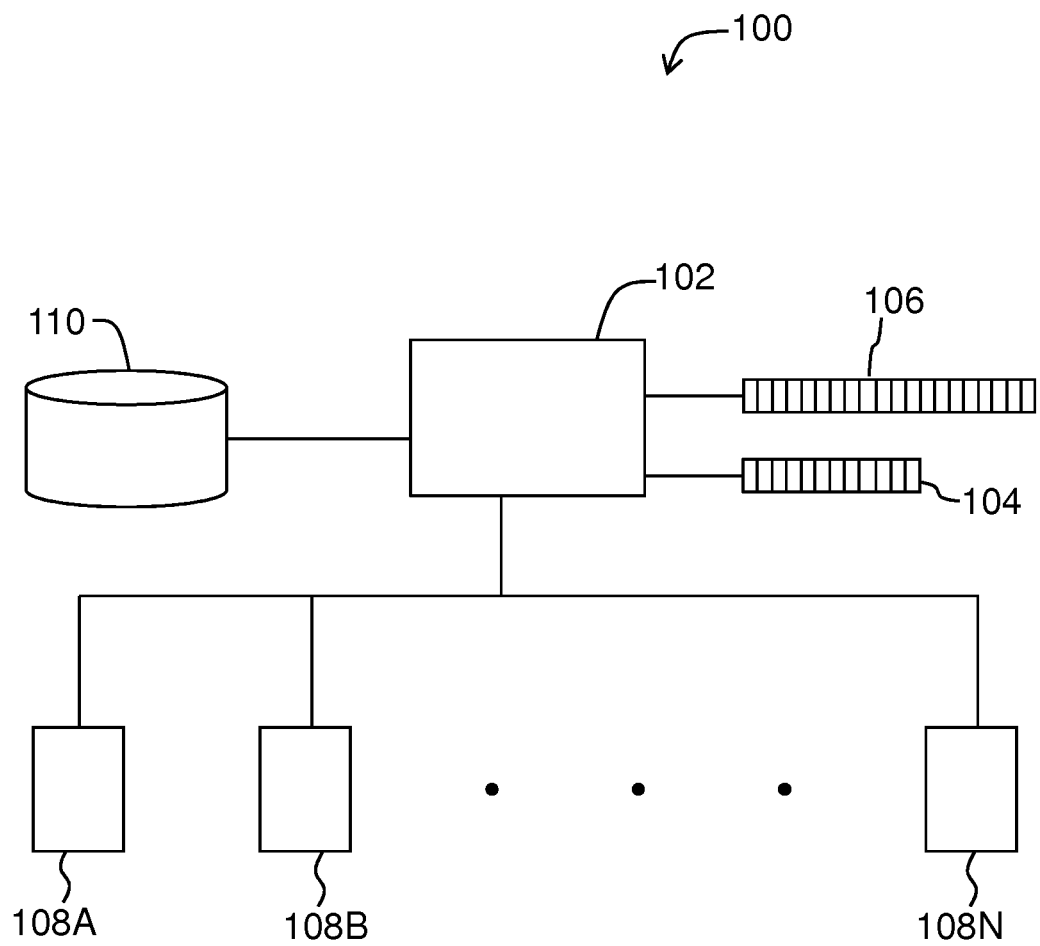
FIG. 4 is a diagram of a data processing system.

FIG. 4 shows a data processing system 100 for parallelizing document indexing. Data processing system 100 is generally comprised of a control computer 102, a job queue 104, a work item queue 106, a cloud process 108, and a data storage medium 110. Data processing system 100 is further comprised of a messaging module (not show in Figure). In an embodiment, data processing system 100 includes at least one control computer 102 and at least one cloud process 108. For example, data processing system 100 may include one control computer 102 and twenty cloud processes 108 a, 108 b, . . . 108 n. In an embodiment, data processing system 100 may be provided utilizing common off-the-shelf hardware.

As shown in FIGS. 1 & 4, each cloud process 108 may be provided by a server 411. Any server 411 may be a multi-processor or multi-core device and may be provided by a virtual machine. Control computer 102 may be a standalone laptop or desktop, or may itself use a server via a terminal to provide keyboard and mouse. Data storage medium 110 may be provided by the memory of control computer 102 or may be a separate non-transitory computer storage device. Generally, each computer (control computer 102 or server 411) will include at least one physical processor (i.e., "chip") operably coupled to at least one non-transitory memory device. Any suitable computer device or combination of computer devices may encompass the functionality as illustrated in FIG. 4. For example, each server 411 may be provided by a cloud computing service, and the physical machine that provides any given server 411 may be, for example, a rack-mounted server device such as the computer sold under the trademark BLADE by Hitachi Data Systems (Santa Clara, Calif.).

In certain embodiments, the indexing system includes a hypervisor or similar product that creates a plurality of virtual machines. The hypervisor can allocate processing power to each virtual machine as-needed or under the control of an administrator. Since the hypervisor can allocate resources as-needed to the virtual machine and re-capture the capacity of idle resources, indexing projects can be accomplished with less time across numerous dedicated machines and particularly with less idle time of dedicated hardware. Any suitable virtual machine product may perform the role of hypervisor. The indexing system creates a desired number of virtual machines in which guest software executes as if it were running directly on physical hardware. The described architecture provides a number of benefits. The system operates at significantly lower energy consumption, resources are used more efficiently in terms of providing results rapidly, and subsystems can be more easily maintained, inspected, updated, and protected that with dedicated hardware embodiments.

In certain embodiments, one or more of the virtual machines each allow a guest OS (e.g., each one designed for the same instruction set) to be run in isolation. This may be allowed by including such tools as, for example, Parallels Workstation, Parallels Desktop for Mac, VirtualBox, Virtual Iron, Oracle VM, Virtual PC, Virtual Server, Hyper-V, VMware Workstation, VMware Server (formerly GSX Server), KVM, QEMU, Adeos, Mac-on-Linux, Win4BSD, Win4Lin Pro, and Egenera vBlade technology, Linux KVM, VMware Workstation, VMware Fusion, Microsoft Hyper-V, Microsoft Virtual PC, Xen, Parallels Desktop for Mac, Oracle VM Server for SPARC, VirtualBox and Parallels Workstation. The hypervisor may be provided by any suitable manager such as, for example, the NVIDIA VGX Hypervisor, which allows a virtual machine to interact directly with a processor. The hypervisor manages resources to allow multiple indexing sub-systems to share common hardware. Each virtual machine can provide a guest operating system or processing environment. The guest OS can provide applications, drivers, APIs, and remote protocol tools. Virtualization and data processing are discussed in U.S. Pat. Nos. 8,239,938; 7,672,790; 7,743,189; U.S. Pub. 2011/0274329; U.S. Pub. 2008/0143707; and U.S. Pub. 2004/0111552, the contents of each of which are incorporated by reference. Components may be onsite or off-site relative to one another or to the computer systems to be indexed. Components can be connected by network resources, which can include the Internet, a WAN or LAN, cellular telephone data networks, other methodology, or a combination thereof. It has been found that operating indexing systems in a virtualized environment with up to 12 physical cores provides particularly useful results. In fact, the more cores the better as the data becomes more complex.

The messaging module of data processing system 100 may be any means for communication between the components of data processing system 100. For example, the messaging module may be a Java Messaging Service (JMS) Application Programming Interface (API) utilized over a gigabit Ethernet. In an embodiment of the present disclosure, the message module is Apache ActiveMQ. In another embodiment, the messaging module utilizes TCP/IP sockets and MPI or PVM messaging libraries. Enterprise messaging systems, which provide additional facilities such as persistent messaging and message queues, may also be adapted as the messaging module. The message processing module further utilizes a messaging processing module to process status messages.

In an embodiment of the present disclosure, data processing system 100 implements a parallel processing architecture in which a large collection of data requires processing and each set of data contains an unpredictable amount of processing requirements. In this architecture, control computer 102 receives a list of data from data storage medium 110. Data storage medium 110 may be, for example, one or more of a hard disk drive, solid state drive (SSD), an optical disc, flash memory, zip disk, tape drive, "cloud" storage location, or a combination thereof. Control computer 102 stores the list of data in local memory utilizing job queue 104 and work item queue 106. In an embodiment, a separate data storage medium, such as a disk-based storage drive, may be used if the entries of work item queue 106 are too large to store in the local memory. Preferably, the list of data is stored in a tangible, non-transitory medium (e.g., one or more of a hard disk drive, solid state drive (SSD), an optical disc, flash memory, zip disk, tape drive, "cloud" storage location, or a combination thereof). It is noted that, pre-indexing, this list typically represents and points to the accumulated, archived, and unstructured work product of a business enterprise (e.g., the communications, contracts, documents of title, incorporation papers, work product, intellectual property, and other materials possessed by an entity).

Control computer 102 creates work items (not shown in Figure) based upon the list of data. A work item in data processing system 100 specifies an item of data that needs to be processed. For example, the item of data within a work item may be an exchange database file (EDB) file, a disk image file, an email message inside a Microsoft Outlook PST file, a Microsoft Word document, a zip file, an email message, and a Lotus Notes database file.

In an embodiment, a work item may be comprised of the physical location of the data stored in data storage medium 110, at least one data identifier to distinguish the location of embedded data associated to the data, and an identifier associated with the data. The identifier associated with the data may be a globally unique ID of the processing job that the work item is a member of. The physical location of the data may be represented by a root URL such as a file path to a PST file ("c:\evidence\input.pst"). The at least one data identifier may be an array of embedded IDs leading to the actual embedded data item inside the top-level data item. The actual values chosen for embedded IDs is implementation-dependent, but a simple implementation could be the embedded child ID based on position. For example, to describe a work item of the second attachment in the seventh email, inside the fourth folder, and inside a PST file, the at least one data identifier would be (assuming indexes start at 0): {"3", "6", "1"}.

Control computer 102 monitors and tracks work items which need to be processed by cloud process 108. Each cloud process 108 can ask control computer 102 for a new work item to process whenever it is idle. In an embodiment, each cloud process 108 executes four separate processes for requesting and processing work items. Once cloud process 108 has finished processing a work item, cloud process 108 may ask control computer 102 for another work item. In another embodiment, control computer 102 provides work items in a batch, for example, ten work items at once, to each cloud process 108 to remove messaging latency. Since each cloud process 108 controls work allocation explicitly, this architecture automatically provides load-balancing.

For the purposes of load-balancing, it is inefficient for cloud process 108 to process an entire exchangeable database file, while another cloud process 108 processes a single electronic file. In an embodiment, cloud process 108 determines characteristics of embedded data within a work item. Cloud process 108 may process the work item based upon the type of embedded data, such as an exchangeable database file, a Microsoft Outlook email file, a Lotus Notes database file, a mailbox message file, an Outlook Express mail file, an Encase disk image file, raw disk image files, and partitions within a disk image. Cloud process 108 may also, for example, utilize the following classifications to determine the appropriate means to process embedded data:

INLINE: indicates a relatively simple embedded data (for example a word processing document) that should be processed immediately without any additional communication to control computer 102.

WORK_ITEM: indicates that the embedded data is sufficiently complex that it should be processed by another cloud process 108. The embedded data is sent to control computer 102 to provide to another cloud process 108 to process this embedded data.

PROCESSING_JOB: indicates that it is very complex data which control computer 102 needs to handle as a separate processing job.

As cloud process 108 processes a data item, which may contain embedded data therein, cloud process 108 may send a status message to control computer 102 to indicate that the embedded data should be processed by another cloud process 108. Upon processing each job and work item within job queue 104 and work item queue 106, control computer 102 may signal each cloud process 108 and any intermediate results created by each cloud process 108 can be passed to control computer 102 for final aggregation.

Data processing system 100 may include a fault tolerance mechanism (not shown in Figure). A fault tolerance mechanism may be provided on control computer 102 and each cloud process 108 to ensure that an entire process does not need to be restarted from the beginning in the event of a software or hardware failure.

In an embodiment, a failure tolerance mechanism is provided on at least one cloud process 108. If cloud process 108 has a software or hardware failure, a fault tolerance mechanism can allow cloud process 108 to restart its processes and continue to receive status messages from control computer 102. The fault tolerance mechanism may be implemented to allow the messaging module to recognize when cloud process 108 has restarted, and if necessary, re-deliver any outstanding status messages to cloud process 108 (or re-route them to other cloud processes 108 108).

A fault tolerance mechanism may also be provided on control computer 102. If control computer 102 has a software or hardware failure, a fault tolerance mechanism can allow control computer 102 to restart its processes and continue to provide status messages to cloud process 108. In an embodiment, each cloud process 108 is restarted upon the failure of control computer 102, and the pending work items in work item queue 106 are serialized to ensure that remaining jobs in job queue 104 are processed upon restarting control computer 102.

Figure 5:
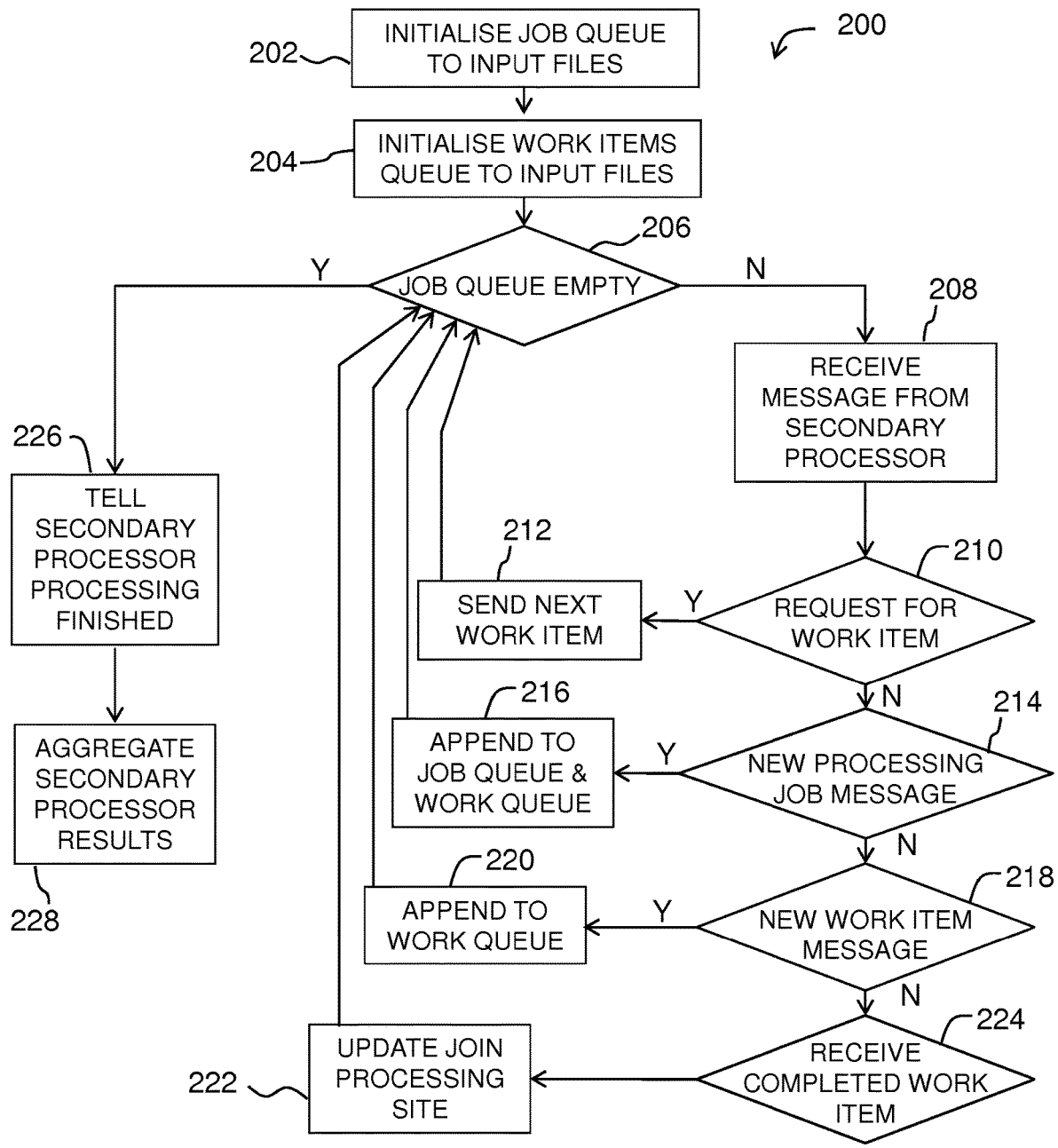
FIG. 5 is a functional block diagram of a method for parallelizing document indexing.

FIG. 5 shows a functional block diagram of a method 200 for parallelizing document indexing performed by a control computer 102. Method 200 may include, but is not limited to the following steps, which are not limited to any particular order.

At step 202, control computer 102 takes a list of data from data storage medium 110 as an input and initializes job queue 104. Control computer 102 creates one entry within job queue 104 for each instance of data.

At step 204, control computer 102 takes the list of data from data storage medium 110 and initializes work item queue 106. Control computer 102 also creates one entry within work item queue 106 for each instance of data. Each entry within job queue 104 is initialized to indicate that it has one unprocessed work item associated with it.

At decision step 206, control computer 102 determines whether job queue 104 is empty. If job queue 104 is empty, control computer 102 continues to step 226. At step 226, control computer 102 provides a status message to each cloud process 108 to indicate that all processing jobs have been completed. At step 228, control computer 102 aggregates the processing results of each cloud process 108.

At step 208, control computer 102 receives a status message from cloud process 108. The status message provided by cloud process 108 may be, but is not limited to, the following: a request for a work item, a request for another cloud process 108 to process a work item, a request for control computer 102 to create a new entry within job queue 104 and provide the new work item to another cloud process 108, a processed work item, or a processed work item related to embedded data.

At decision step 210, control computer 102 processes the status message to determine whether cloud process 108 is requesting a new work item. If cloud process 108 requests a new work item, control computer 102 proceeds to step 212. At step 212, control computer 102 takes the next work item in work item queue 106 and provides the work item to cloud process 108. Control computer 102 proceeds to step 206.

At decision step 214, control computer 102 processes the status message to determine whether cloud process 108 is requesting control computer 102 to create a new entry within job queue 104 and provide the new work item to another cloud process 108. If cloud process 108 requests control computer 102 to create a new entry within job queue 104, control computer 102 proceeds to step 216. At step 216, control computer 102 appends job queue 104 and work item queue 106 and creates new entries therein. Control computer 102 proceeds to step 206.

At decision step 218, control computer 102 processes the status message to determine whether cloud process 108 is requesting another cloud process 108 to process the work item. If cloud process 108 is requesting another cloud process 108 to process the work item, control computer 102 proceeds to step 220. At step 220, control computer 102 appends the work item to work item queue 106. At step 222, the entry within job queue 104, in which the appended work item is associated, is updated. In an embodiment, job queue 104 is incremented by one to represent that a work item remains unprocessed. The step of incrementing is performed to ensure that it is clear when a processing job has been completed. A processing job is completed when there is no longer any unprocessed work items associated with that processing job.

At step 224, control computer 102 processes the status message to determine whether cloud process 108 is providing a processed work item. If cloud process 108 is providing a processed work item, control computer 102 proceeds to step 222. In an embodiment, upon receiving a processed work item, control computer 102 decrements work item queue 106 for the associated work item. If work item queue 106 is decremented to a value of zero, the associated entry within job queue 104 is removed from job queue 104.

Figure 6:
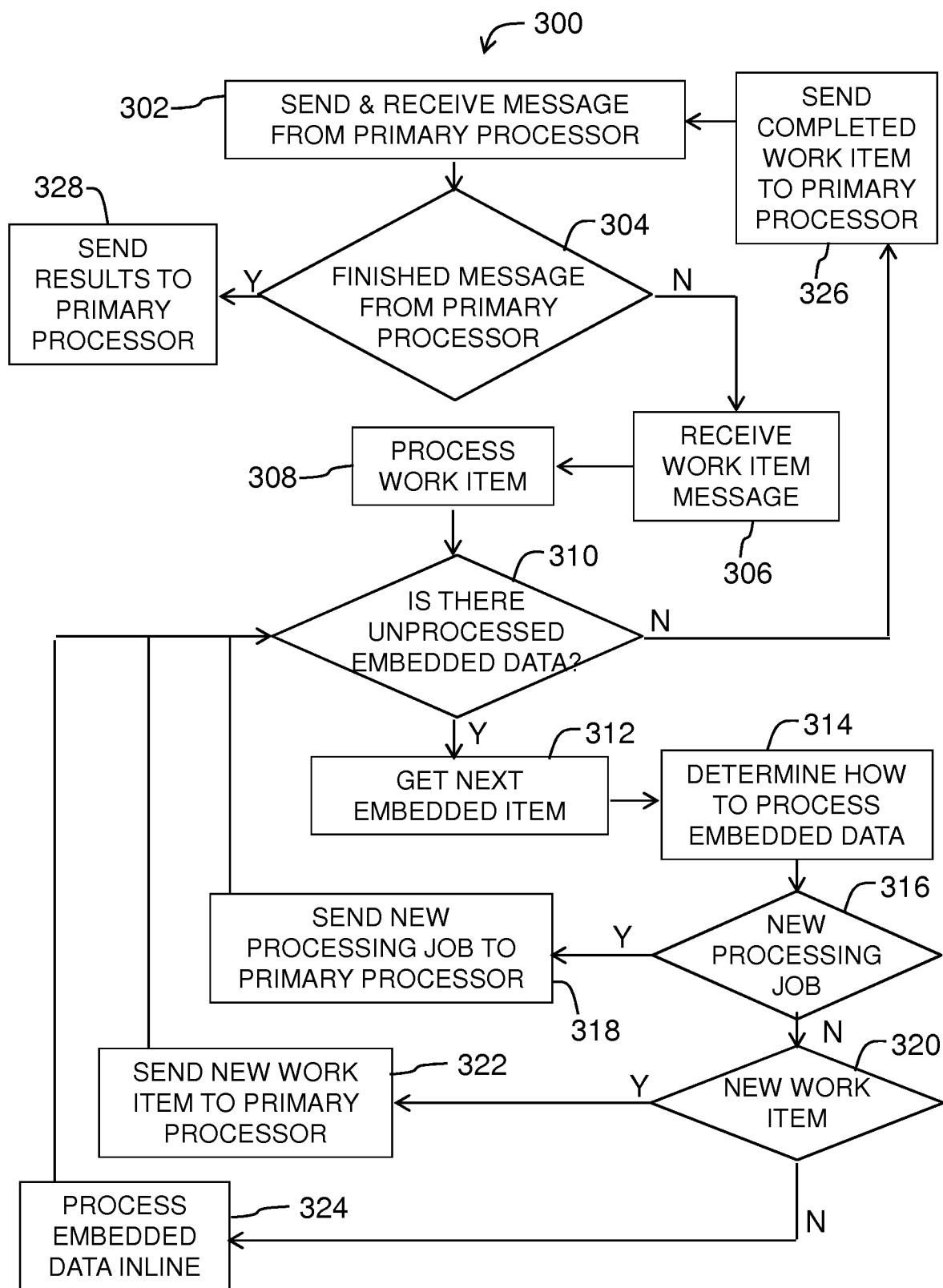
FIG. 6 is a diagram of indexing methods of the invention.

FIG. 6 shows a block diagram of a method 300 performed by at least one cloud process 108 for parallelizing document indexing. Method 300 may include, but is not limited to, the following steps, which are not limited to any particular order.

At step 302, cloud process 108 communicates with control computer 102 via the messaging module. Cloud process 108 sends a status message to control computer 102 to request a work item if it has no active work items to process. Upon sending a message to control computer 102, cloud process 108 waits for a response status message from control computer 102.

At decision step 304, cloud process 108 receives a status message from control computer 102. If control computer 102 provides a status message to indicate that all processing jobs have been completed, cloud process 108 proceeds to step 328. At step 328, cloud process 108 transmits a status message, which includes the results of the processed work items, to control computer 102. In an embodiment, the step of transmitting occurs via a remote-file system copy.

At step 306, cloud process 108 receives and processes a status message relating to a work item from control computer 102. At step 308, cloud process 108 processes the work item as set forth in the status message. The actual work item described in the status message is interpreted by cloud process 108 to ensure that it is clear which data needs to be processed. For example, the data could be email number 56 in an archive file.

At decision step 310, cloud process 108 determines if the data of the work item contains embedded data. For example, embedded data may be an electronic mail which contains attachments, or a Microsoft PST folder which contains an email message. If cloud process 108 determines that the work item contains embedded data, cloud process 108 proceeds to step 312.

At step 312, cloud process 108 processes the work item to extract the embedded data. At step 314, cloud process 108 determines a characteristic of the embedded data. Based upon the characteristic of the embedded data, cloud process 108 determines the appropriate means to process the embedded data.

At decision step 316, the cloud process 108 determines whether the work item contains very complex data. At step 318, if the cloud process 108 determines that the work item is complex, cloud process 108 will provide a status message to control computer 102 to create a new entry within job queue 104 and provide the new work item to another cloud process 108.

At decision step 320, cloud process 108 determines whether the work item should be handled by another cloud process 108. At step 322, if cloud process 108 determines that the work item should be handled by another cloud process 108, cloud process 108 will send a status message, which includes the work item, to control computer 102.

At step 324, cloud process 108 processes the embedded data. At step 326, cloud process 108 transmits a status message, which includes the completed work item and associated embedded data, to control computer 102.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

Example 1

Test models of this platform have been privately developed and tested successfully on Microsoft Azure and Amazon AWS platforms. Testing has shown that systems and methods of the invention can successfully make searchable 10 mailboxes—totaling 13.6 GB—in approximately 37 minutes on the Azure platform using four A7 instances. A second example is when Nuix engineers were able to collect in place and full-text process 22 Outlook-365 mailboxes containing the entire Enron data set (close to 1,000,000 items and 45 GB in size) from Exchange Online in 24 minutes. The Enron email dataset was published by the Federal Energy Regulatory Commission and can be downloaded from the website for the Carnegie Mellon University school of Computer Science. The Enron email dataset is a large database of over 600,000 emails generated by 158 employees of the Enron Corporation and acquired by the Federal Energy Regulatory Commission during its investigation after the company's collapse. The Enron email dataset is known in the art and has its own entry in Wikipedia at "Enron Corpus". The entire Enron Corpus was index in 24 minutes using systems and methods of the invention. The mail boxes were then ready to be thoroughly searched. It is hypothesized that 20+ instances could be used to maximize the benefit of Azure's infrastructure.

Example 2

Two different user interfaces (UIs) have been developed. One UI provides a very detailed, investigative Workbench.

Another UI provides a simple e-Discovery dashboard to guide a user through a workflow in such a way that even a lay user is unlikely to get any input details wrong.

Example 3

Systems and methods of the invention collect from Office 365 and SharePoint.

Example 4

An indexing system was used to index more than 3.1 billion email messages in a client's email archives kept in WORM storage. The system found an additional 500 million messages no-one knew were there.

Example 5

An indexing system may be used to analyze a small segment of a file share data for a company. Although the company had already paid its service provider to clean the data, a system may find 5% duplication at the file system level. When complex file types such a zip and PST files are included, the system may identify a total duplication rate of 25%.

Example 6

An indexing system may be operated in a virtualized environment with 12 processes and multiple virtual machines and obtain particularly useful results in terms of efficiency and rapidity.

What is claimed is:

1. A method for extracting content of a plurality of items in a storage system, the method comprising:
providing a cloud-based system configured to initiate a first cloud process, the first process configured to extract content of an item of the plurality of items, and configured to controllably initiate a second cloud process, said second cloud process configured to extract the content of said item;
accessing a storage system comprising the plurality of items, each item stored in one of a plurality of data centers, by accessing each item within the data center where that item is stored;
identifying, by the first process, a first item from among the plurality of items, which first item includes content comprising an embedded second item;
for said first item:
determining, by the first process, which process from among the first process and the second process to use to extract content from the first item, said process being a selected process; and
extracting content of said item, including the embedded second item, using the selected process in the cloud computer service;
collecting results from the extracting at a control system; and
providing all of said results in a format selected from a group consisting of PDF, Tiff, text, and the native format of the results.

2. The method of claim 1, wherein accessing each item within the data center comprises using a password specific to that item.

3. The method of claim 1, wherein the plurality of items includes email accounts; documents; folders; and items that are not text-searchable.

4. The method of claim 3, wherein items that are not text-searchable include PDF-formatted files and image files, and further wherein extracting content of items that are not text searchable comprises performing a character recognition operation on those items to generate text and identifying character strings within the text.

5. The method of claim 1, wherein each of the plurality of data centers comprises a separate building housing storage computers.

6. The method of claim 1, wherein each item is stored in one of the plurality of data centers within a computer device comprising a non-transitory memory.

7. The method of claim 1, wherein the control system comprises at least one control computer comprising a control processor coupled to a non-transitory memory.

8. The method of claim 1, wherein the plurality of items comprises email accounts and further wherein accessing those email accounts includes use of a password for each account or an admin password to access multiple accounts.

9. The method of claim 1, wherein the plurality of data centers are each part of the cloud computing service.

10. The method of claim 9, wherein content of each item is extracted within the data center where that item is stored.

11. A system for extracting content of a plurality of items in a storage system, the system comprising:
a control computer comprising a processor coupled to a non-transitory memory containing instructions causing the control computer to coordinate a content extracting operation of data stored in a cloud comprising a plurality of items, each item stored in one of a plurality of data centers, by:
accessing each item within the data center where that item is stored;
identifying, by a first cloud process, a first item from the plurality of items, which first item includes content comprising an embedded second item;
determining, by the first cloud process, which process from among the first cloud process and a second cloud process, to use to extract the content from the first item, said process being a selected process;
causing selected process within that data center to extract content of that item;
collecting or compiling the content extracted from the plurality of items; and
providing all of the results in a format selected from a group consisting of PDF, Tiff, text, and the native format of the results.

12. The system of claim 11, wherein accessing each item within the data center comprises using a password specific to that item.

13. The system of claim 11, wherein the plurality of items includes email accounts; documents; folders; and items that are not text-searchable held in email system files or document management systems.

14. The system of claim 13, wherein items that are not text-searchable include PDF-formatted files and image files, and further wherein extracting content of items that are not text searchable comprises performing a character recognition operation on those items to generate text and identifying character strings within the text.

15. The system of claim 11, wherein each of the plurality of data centers comprises a separate building housing storage computers.

16. The system of claim 11, wherein each item is stored in one of the plurality of data centers within a computer device comprising a non-transitory memory.

17. The system of claim 11, wherein the control computer is further operable to cause each process to determine whether to extract content of an item directly or to itself cause a second process to index the item.

18. The system of claim 11, wherein the plurality of items comprises email accounts or documents in file sharing or document management systems and further wherein accessing those email accounts and documents includes use of a password for each account.

19. The system of claim 11, wherein the plurality of data centers are each part of a cloud computing service.

20. The system of claim 19, wherein each process used to extract content of the items is provided by the cloud computing service.

* * * * *